United States Patent
Ciancio et al.

(10) Patent No.: US 6,190,275 B1
(45) Date of Patent: Feb. 20, 2001

(54) BICYCLE CHAIN ANTI-SNARE DEVICE

(76) Inventors: Gregory J. Ciancio, 46 Lynne Dr., Ocean, NJ (US) 07712; John J. Senopole, 19 Aldrich Dr., Howell, NJ (US) 07731

(*) Notice: Under 35 U.S.C. 154(b), the term of this patent shall be extended for 0 days.

(21) Appl. No.: 09/318,983

(22) Filed: May 26, 1999

(51) Int. Cl.[7] .................................................. F16H 57/12
(52) U.S. Cl. ................................................ 474/144; 474/80
(58) Field of Search ................................ 747/80, 81, 101, 747/113–117, 133–138, 190, 191, 144, 143

(56) References Cited

U.S. PATENT DOCUMENTS

| | | | |
|---|---|---|---|
| 3,785,219 | * | 1/1974 | Anthamatten .......................... 474/81 |
| 4,121,474 | * | 10/1978 | Suinaga ................................. 474/160 |
| 5,244,439 | * | 9/1993 | Rogus .................................... 474/136 |

FOREIGN PATENT DOCUMENTS

| | | | |
|---|---|---|---|
| 222429 | * | 7/1942 | (CH) . |
| 830162 | * | 7/1938 | (FR) . |
| 442390 | * | 11/1948 | (FR) . |
| 164260 | * | 4/1936 | (GB) . |
| 475021 | * | 11/1937 | (GB) . |
| 86100 | * | 4/1936 | (SE) . |

* cited by examiner

Primary Examiner—David A. Bucci
Assistant Examiner—Marcus Charles
(74) Attorney, Agent, or Firm—Charles I. Brodsky

(57) ABSTRACT

An anti-snare device including a roller dimensioned and positioned to deflect away, and thereby prevent, a bouncing bicycle chain from contacting the lower-rear quadrant of a chain ring gear when shifting to a smaller front gear during vigorous pedaling, and from catching on a tooth on the upwardly rotating section of the gear.

7 Claims, 3 Drawing Sheets

BICYCLE CHAIN ANTI-SNARE DEVICE

FIELD OF THE INVENTION

This invention relates to the assembling of bicycles to be used to in competitions and vigorous off-road ridings, and, more particularly, to a new and improved chain guard which enhances such activities.

BACKGROUND OF INVENTION

As is well known, and understood, the recreational use of bicycles and bicycle competitions have increased significantly since the introduction of the off-road or BMX type bicycle—and has become a multi-billion dollar concern. As is also known, such type of bicycle is designed to be ridden up and down hills, over all kinds of terrain including rocks, dirt, sand, water, etc., requiring more vigorous peddling and a greater need for reliability under adverse conditions. To address this, the rider is often joined to the bicycle via a locking clip in the pedal, which prevents the rider from jumping off the bike in the event the chain jams the pedal mechanism, causing the rider and the bicycle to fall. To gain market share and altering performance, companies spend hundreds of millions of dollars improving the designs to create a less bumpy ride (adding shock absorbers and floating forks, and making peddling easier) and increasing the number of gears at both the crank and rear axles.

As is understood, the reason that bicycle companies have focused on the number of gears offered—numbering twenty-one and higher—is that a rider can select a gear that gives the most efficient conversion of peddling into forward motion, permitting the rider to navigate hills and obstacles more effectively, and faster without exhaustion. Additionally, as some riders use these kinds of bicycles on the edge of safety, they require the immediate response to their demands, and the ability to propel themselves over and around obstacles. As a result of the vigorous, uncompromising demands on the mechanics that drive the rear wheel—pedals, cranks, chain ring, chains, cassettes and cogs—it regularly occurs that when a rider shifts the front gear to a smaller diameter ring under pressure, the bottom of the chain bounces, slapping against the rear of the chain ring. When the chain contacts the rear of the chain ring being driven by the cranks in this manner, the chain often catches on a tooth on the upwardly moving gear, causing it to get drawn up against the frame of the bicycle and locking up the peddling mechanism. In a racing competition, for example, this can result in the participant falling back many places and/or losing.

OBJECTS OF THE INVENTION

It is an object of the present invention, therefore, to provide a roller-guard which prevents the chain from contacting the teeth on the chain ring at inappropriate times.

It is also an object of the invention to provide such a guard as is useful to the professional racer as it is to the casual rider.

It is another object of the invention to provide such a guard which is useful on bicycles having a floating rear fork, as well as one which is solidly affixed to the frame.

SUMMARY OF THE INVENTION

As will become clear from the description that follows, the roller-guard of the invention enhances the riding of off-road, BMX type bicycles through the use of an easily manufactured, inexpensive, durable, lightweight guard. As will become clear, the guard may generally be constructed in the form of an aluminum arm terminating in a ring on one end which fits between the bracket shell and pedal crank of the bicycle, and with a narrow end having provisions for the attachment of a resilient durable roller. As will further become clear, the arm holds the roller between the chain and the lower-rear quadrant of the chain rings, thereby preventing the chain from inappropriately contacting the chain ring. In a preferred embodiment of the invention, the roller is removable and fabricated of rubber, with the ability to be rotated around a central spindle so as to have little wear or friction upon contacting the chain.

BRIEF DESCRIPTION OF THE DRAWINGS

These and other features of the invention will be more clearly understood from a consideration of the following description, taken in connection with the accompanying drawings, in which.

DETAILED DESCRIPTION OF THE DRAWINGS

Figure 1:
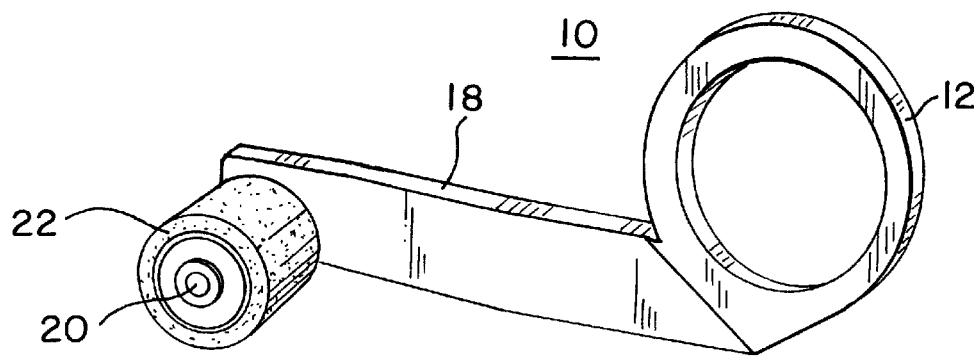
FIG. 1 is a side view of a roller-guard according to the invention, showing a roller, roller spindle, compression ring, and extension arm.

In FIGS. 1, 2, 3, and 7, the roller-guard of the invention 10 is shown as having a compression ring 12—being of a diameter and thickness substantially identical to the bracket shell 14 of the bicycle so as to permit it to be inserted and compressed between the threaded locking ring 32 and the bracket shell 14. The surface of the compression ring 12 is textured so as to provide sufficient traction to prevent it from rotating about its axis when compressed. Extending forward from the bottom of the compression ring 12 is an extension arm 18, having an exterior terminus at which is located a roller spindle 20, to secure the roller 22. The roller 22 is composed of a resilient compound that permits a chain 24 to bounce off without damaging either the chain 24 or the roller 22 itself. The extension arm 18 is formed in such a way as to position the roller 22 between the chain 24 and the gear chain rings 26, without touching either during normal operation. Additionally, the compression ring 12 and the extension arm 18 are composed of a lightweight, strong material (such as aluminum) so to add as little weight as possible to the bicycle to which it is attached.

Figure 2:
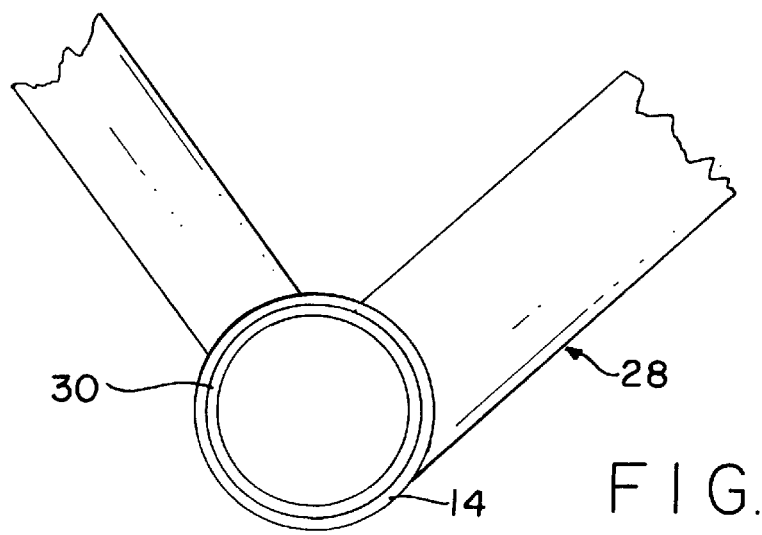
FIG. 2 is a side view of a bicycle frame, showing its threaded bracket shell, seat support arm, and front frame arm.
Figure 3:
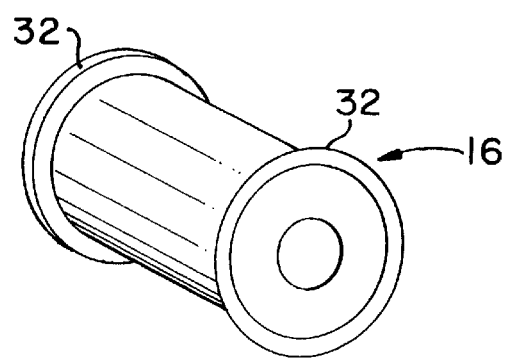
FIG. 3 is a side perspective of the sealed bearing cartridge of the bicycle, showing its threaded locking rings, and its central crank spindle.

FIGS. 2 and 3 show the frame 28 of a bicycle having the bracket shell 14 which receives a sealed bearing cartridge 16. The threaded openings 30 of the bracket shell 14 mate to the threaded locking rings 32 of the bearing cartridge 16 when it is inserted.

Figure 4:
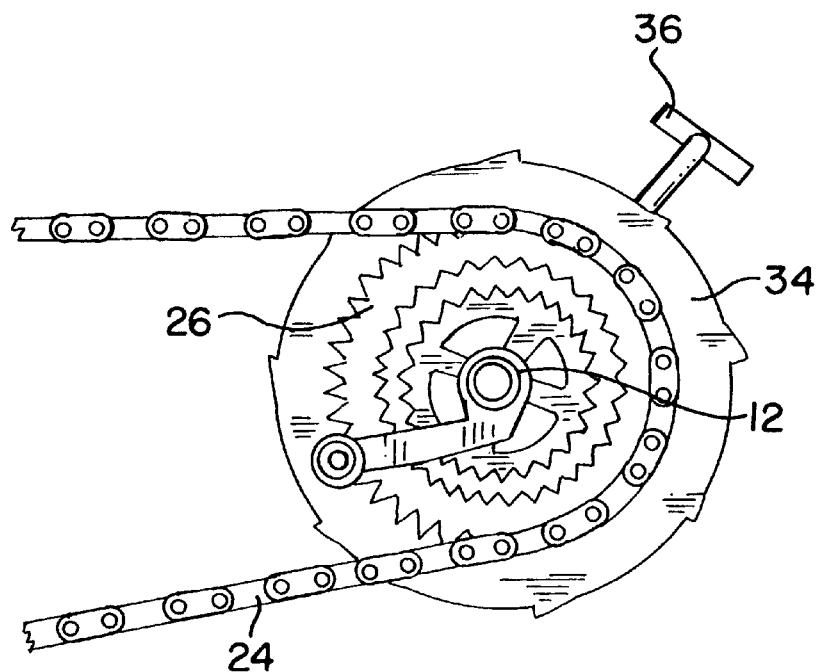
FIG. 4 is a side perspective view of the roller-guard in its position in relation to the pedal, the gear chain rings and chain, in carrying out the teachings of the invention.
Figure 6:
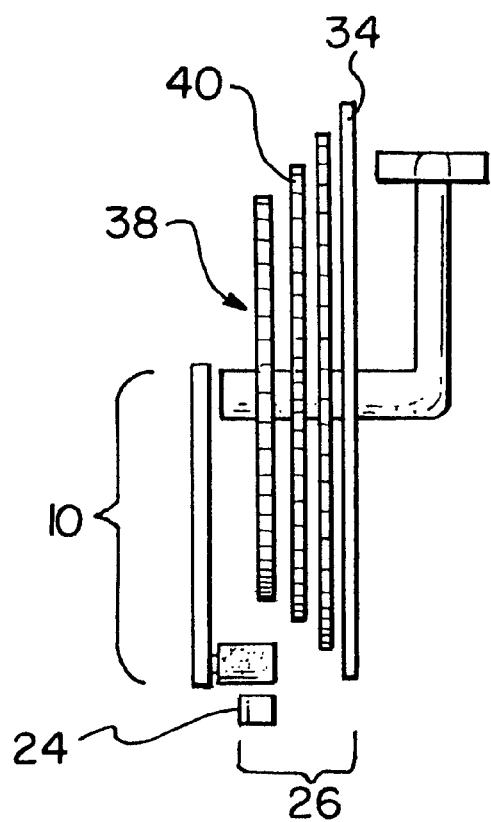
FIG. 6 is a front view of the rock ring, gear chain rings, and roller-guard showing the difference in sizes between the various rings and the positioning of the invention when installed.
Figure 7:
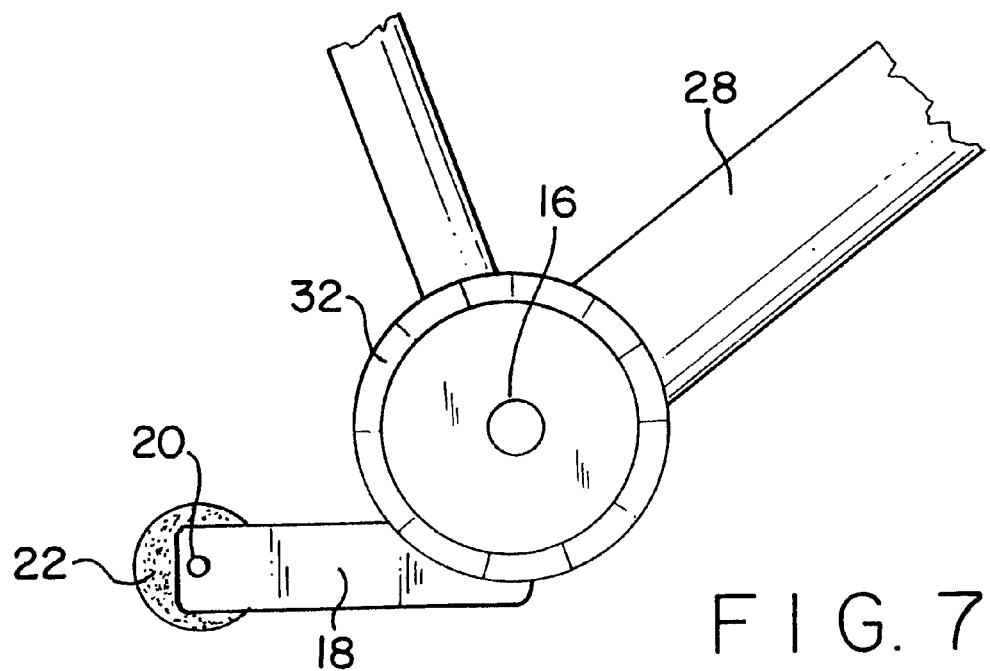
FIG. 7 is a side view of the roller-guard, threaded locking ring, bearing cassette, and bicycle frame showing the position of the roller guard prior to installing the gear and pedal mechanism.

FIGS. 4 and 6 illustrate how the roller-guard 10 aligns with the chain 24, the gear chain rings 26, a rock ring 34, and the pedal 36. The roller 22 is positioned over the inner gear chain ring 38, so as to be concealed behind the rock ring 34, protecting it from contacting such debris as rocks, shrubs, etc.

Figure 5:
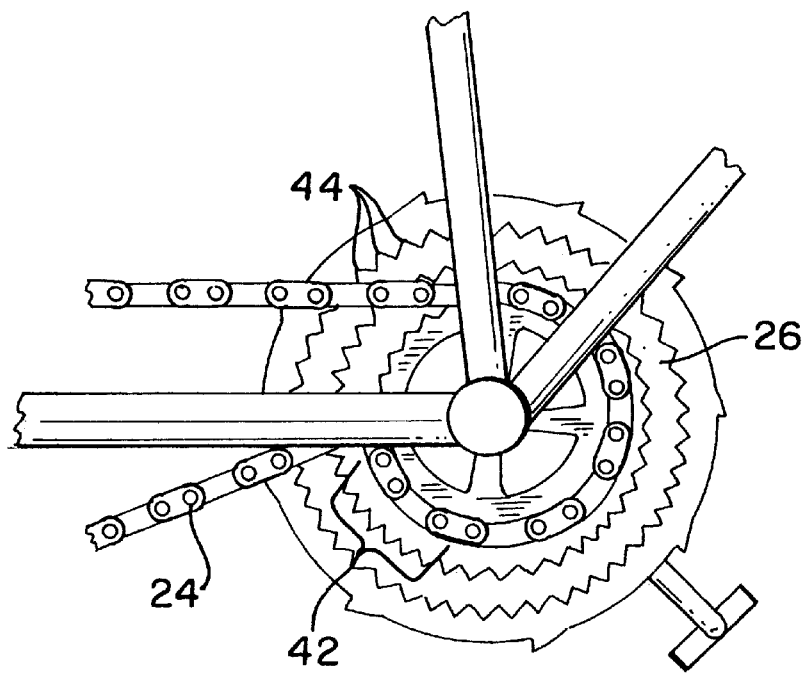
FIG. 5 is a side cut-away perspective view of a bicycle showing a chain wrapped around the rear end of the smallest gear chain ring, jammed against the frame of the bicycle in disabling it.

FIG. 5 shows the chain 24 wrapped around the rear of the inner gear chain ring 38 and becoming jammed against the bicycle frame 28. During usage under pressure, when a rider shifts the chain 24 from the middle gear chain ring 40 to the inner gear chain ring 38, the chain 24 bounces as a result of the change in size between the two gear chain rings, and the change in the speed at which the chain 24, is moving. If the chain 24 contacts the lower-rear quadrant 42, of the gear chain rings 26, the chain may catch on a tooth 44 and be drawn up the back quadrant 42, until it contacts the frame 28—seizing the chain 24, the gear chain rings 26, and the pedals 36, causing the rider to stop or fall. In addition, when the chain 24 jams against the frame 28, wearing is caused between the two, which over time may cause structural failure to the frame 28 and/or the chain 24.

In the use of the invention—where the rider simply installs the roller-guard 10 so that the roller 22 hovers between the chain 24 and the gear chain rings 26—the rider is able to continue with almost reckless abandon without being concerned that the chain will be drawn up against the frame 28 of the bicycle and jam the pedaling mechanism. As the roller-guard 10 installs at the bracket shell 14 (which every bicycle has) it can be used with either fixed rear-fork bicycles, or with bicycles having floating rear-forks.

While there have been described what are considered to be preferred embodiments of the present invention, it will be readily appreciated by those skilled in the art that modifications can be made without departing from the scope of the teachings herein. Thus, whereas, an installable extension arm has been depicted, it will be appreciated that this arm amy be integrated with the frame at the time of manufacture, thereby eliminating the necessity for the compression ring. Additionally, while aluminum is referenced as the material used to construct the invention, it will be understood that it may be composed of other rigid, light-weight materials such as plastic or graphite. For at least such reasons, therefore, resort should be had to the claims appended hereto for a true understanding of the scope of the invention.

What is claimed is:

1. An anti-snare roller-guard for the chain of a bicycle having a plurality of gear chain rings on a pedal assembly, comprising: a compression ring; a roller spindle; a roller on said spindle; and an extension arm between said compression ring and said spindle; with said roller, said spindle and said extension arm being positioned to fix said roller between said bicycle chain and a bottom lower quadrant of said plurality of gear chain rings and with said roller being dimensioned and positioned to deflect a bouncing bicycle chain away from said gear chain rings when contacted.

2. The roller-guard of claim 1, wherein said roller is positioned as a limiting stop to the motion of said bicycle chain without wear of the chain itself.

3. The roller-guard of claim 1, wherein said roller spindle is positioned to permit said roller to rotate freely about its axis.

4. The roller-guard of claim 1, wherein said compression ring is composed of a material to prevent it from rotating about its axis when compressed between a securing ring and a bracket shell of a frame of said bicycle.

5. The roller-guard of claim 2, wherein said roller is composed of a material to limit wear when contacted by said bicycle chain.

6. The roller-guard of claim 4, wherein said compression ring is composed of a rigid light weight material of textured surface.

7. The roller-guard of claim 5, wherein said roller is composed of a resilient pliable material.

* * * * *